(12) United States Patent
Allard

(10) Patent No.: US 8,155,714 B2
(45) Date of Patent: Apr. 10, 2012

(54) PORTABLE MEDIA PLAYER HAVING A FLIP FORM FACTOR

(75) Inventor: James E. Allard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 12/164,027

(22) Filed: Jun. 28, 2008

(65) Prior Publication Data

US 2009/0326689 A1    Dec. 31, 2009

(51) Int. Cl.
*H04B 1/38* (2006.01)
(52) U.S. Cl. .................. 455/575.3; 455/90.1; 455/575.1; 455/550.1; 455/575.4
(58) Field of Classification Search .................. 455/403, 455/414.1, 550.1, 90.3, 571.1, 575.3, 575.4, 455/566; 345/156; 361/679.3, 679.27, 679.58
See application file for complete search history.

(56) References Cited

U.S. PATENT DOCUMENTS

| 5,555,157 | A | 9/1996 | Moller et al. |
| 2002/0180694 | A1 | 12/2002 | Isaacson |
| 2003/0160754 | A1 | 8/2003 | Hanson et al. |
| 2005/0087993 | A1 | 4/2005 | Lin |
| 2006/0084465 | A1 | 4/2006 | Kim |

*Primary Examiner* — Jean Gelin
(74) *Attorney, Agent, or Firm* — Mayer & Williams P.C.

(57) ABSTRACT

A portable media player is configured with a flip form factor in which a flip cover is hingedly fixed to a main body portion of the player. The flip cover rotates about the hinge between open positions that expose the display screen and user controls of the player and a closed position that covers that screen and controls to keep them clean and protected against damage when the player is being used or transported. The flip cover includes a set of secondary user controls on its exterior surface so that the user may operate the player when the flip cover is in its closed position. The hinge is configured to provide sufficient frictional torque over its angular range of motion to enable the flip cover to operate as a built-in display stand to angle the display screen for comfortable viewing. The flip cover further provides additional surface area for personalization.

11 Claims, 11 Drawing Sheets

PORTABLE MEDIA PLAYER HAVING A FLIP FORM FACTOR

BACKGROUND

Portable media players such as MP3 (Moving Pictures Expert Group, MPEG-1, audio layer 3) players, PDAs (personal digital assistants), mobile phones, smart phones, and similar devices typically enable users to interact with and consume media content such as music and video. Such players are generally compact and lightweight and operate on battery power to give users a lot of flexibility in choosing when and where to consume media content. As a result, portable media players have become widely accepted and used in all kinds of environments, including those where users are very active or out and about in their busy lifestyles. For example, when at the beach, a user might watch an episode of a favorite television show. The portable media player can then be placed in a pocket so that the user can listen to music while exercising, or when riding on the train back home.

For many users, portable media players have become objects of personal expression whereby their players are customized or personalized with graphics and/or text. Player manufacturers and aftermarket suppliers have introduced a wide variety of cases, vinyl "skins" and other accessories to meet the market opportunities presented by the personalization trend. Current portable media players are configured with a display screen and with an input device positioned below the screen. Some devices also use touch screens to interact with the device.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A portable media player is advantageously configured with a flip form factor (also known as a "clamshell") in which a flip cover is hingedly fixed to a main body portion of the player. The flip cover can rotate about the hinge between open positions that expose the display screen and user controls of the player and a closed position that covers that screen and controls to keep them clean and protected against scratches or other damage when the player is being used or transported (for example when placed in a pants or jacket pocket). The flip cover includes a set of secondary user controls on its exterior surface so that the user may operate the player when the flip cover is in its closed position. The hinge is configured to provide sufficient frictional torque over its angular range of motion to enable the flip cover to operate as a built-in display stand to support the weight of the main body when positioned so as to angle the display screen for comfortable viewing. The flip cover further provides additional surface area for personalizing the player.

In various alternative examples, the flip cover includes a secondary display on its exterior surface. The secondary display can be used to show operational status such as track name or artist when music is playing on the player when the flip cover is closed. One or more of the main user controls may also be positioned on the interior of the flip cover so that the main controls and main display are positioned on separate hinged portions of the portable media player. Various types of locking or latching mechanisms may also be utilized, including magnetic clasps to secure the flip cover in the closed position and to provide tactile feedback to the user that the flip cover is in its fully closed and locked position This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
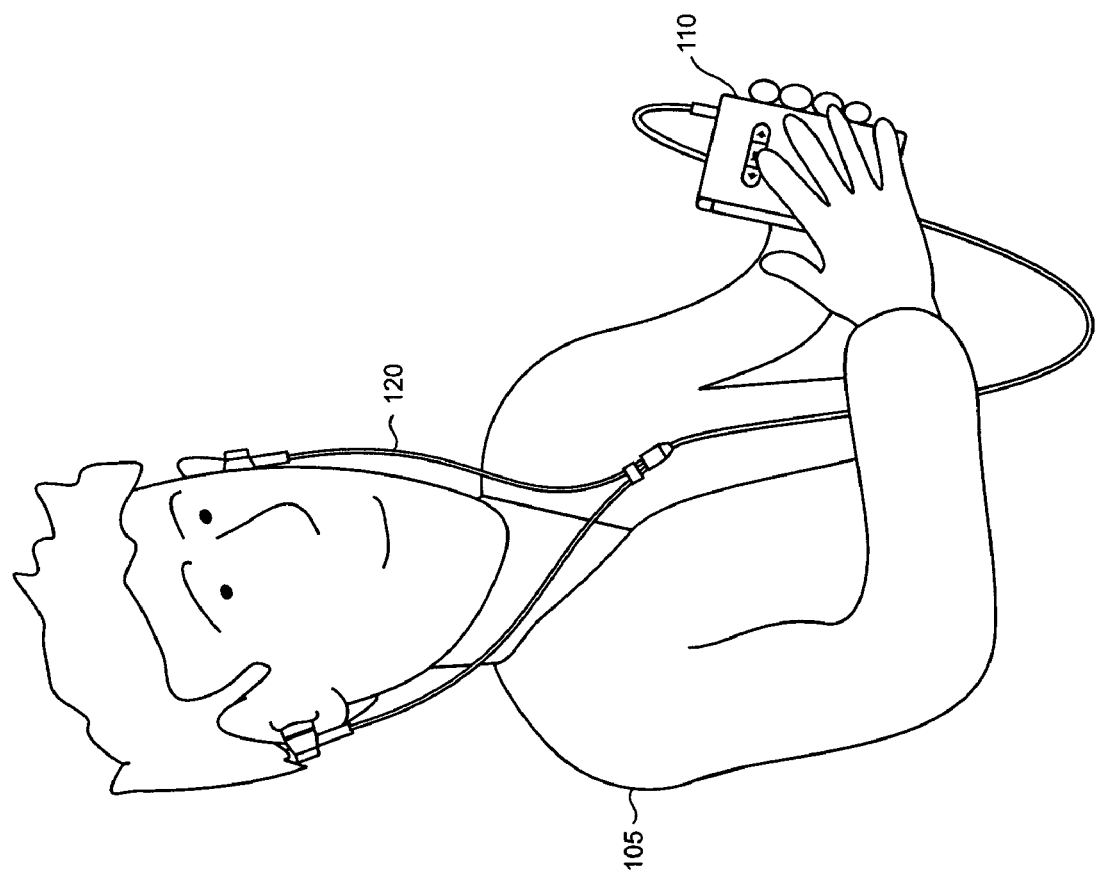
FIG. 1 shows an illustrative usage environment in which a user listens to audio content being rendered through earphones by an illustrative portable media player that has a flip form factor.

FIG. 1 shows an illustrative portable device usage environment 100 in which a user 105 interacts with digital media content rendered by a portable media player 110. In this example, the portable media player 110 is configured with capabilities to play audio content such as MP3 files or content from over-the-air radio stations, display video and photographs, and render other content. The user 105 will typically use earphones 120 to enable audio content, such as music or the audio portion of video content, to be consumed privately (i.e., without the audio content being heard by others) and at volume levels that are satisfactory for the user while maintaining good battery life in the portable media player. Earphones 120 are representative of a class of devices used to render audio which may also be known as headphones, earbuds, headsets, and by other terms. Earphones 120 generally will be configured with a pair of audio speakers (one for each ear), or less commonly a single speaker, along with a means to place the speakers close to the user's ears.

Figure 3:
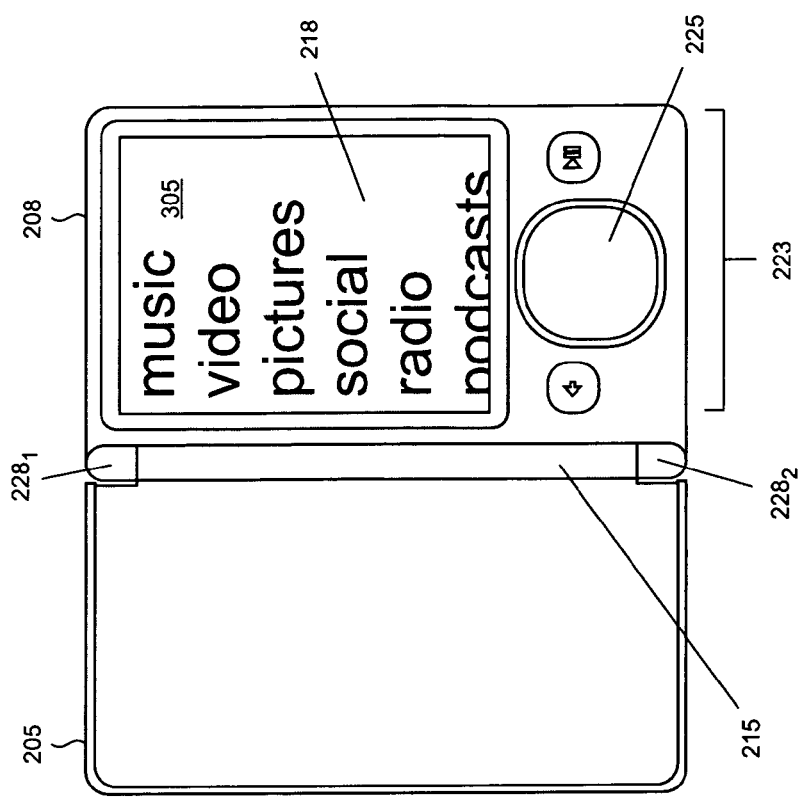
FIG. 3 is a front view of the portable media player in which the flip cover is open.
Figure 2:
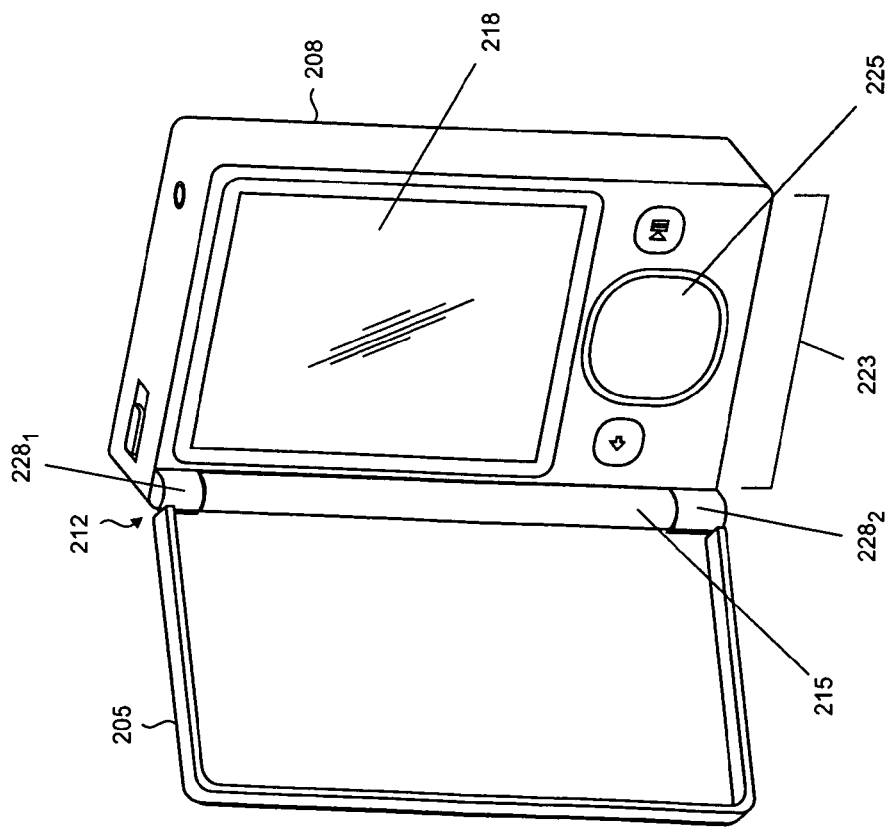
FIG. 2 is a pictorial view of an illustrative portable media player in which the flip cover portion of the player is open.

FIG. 2 is a pictorial view of portable media player 110 in which a portion of the player termed the flip cover 205 is in an open position. FIG. 3 is a front view of the portable media player 110 when the flip cover 205 is fully open. The portable media player 110 is arranged to include a display screen 218 and user controls 223. The display screen 218 is used to support a graphical user interface ("GUI") that uses menus, icons, and the like (as representatively indicated by reference numeral 305 in FIG. 3) to enable the user 105 to find, select, and control playback of media content that is available to the player 110. In addition to supporting the GUI 305, the display screen 218 is also used to render video content, typically by turning the player 110 to a landscape orientation so that the long axis of the display screen 218 is parallel to the ground.

The user controls 223, in this example, include a gesture pad 225, called a G-Pad, which combines the functionality of a conventional directional pad (i.e., a "D-pad") with a touch sensitive surface as described in U.S. Patent Application Ser. No. 60/987,399, filed Nov. 12, 2007, entitled "User Interface with Physics Engine for Natural Gestural Control," owned by the assignee of the present application and hereby incorporated by reference in its entirety having the same effect as if set forth in length. However, other types of user controls, including conventional controls, may also be used depending on the requirements of a particular implementation.

As shown in FIGS. 2 and 3, the advantageous flip cover 205 is rotatably mounted to the body 208 of the portable media player 110 along the long side of the player using a hinge 212. In alternative arrangements, the flip cover 205 may be rotatably mounted along the short side of the portable media player 110. In this example, the body 208 houses many of the components (shown in FIGS. 16 and 17 as described in the accompanying text) that are utilized to facilitate the functionality implemented by the player 110. For example, the battery, central processor, system memory, media content store, and communication interfaces, for example, will generally be contained in the body 208 for packaging efficiency. However, in alternative arrangements, components may be split between the flip cover 205 and body 208. In this case, a flexible bus, such as ribbon connector, will typically be implemented to couple the flip cover 205 and body 208 across the hinge 212.

Figure 4:
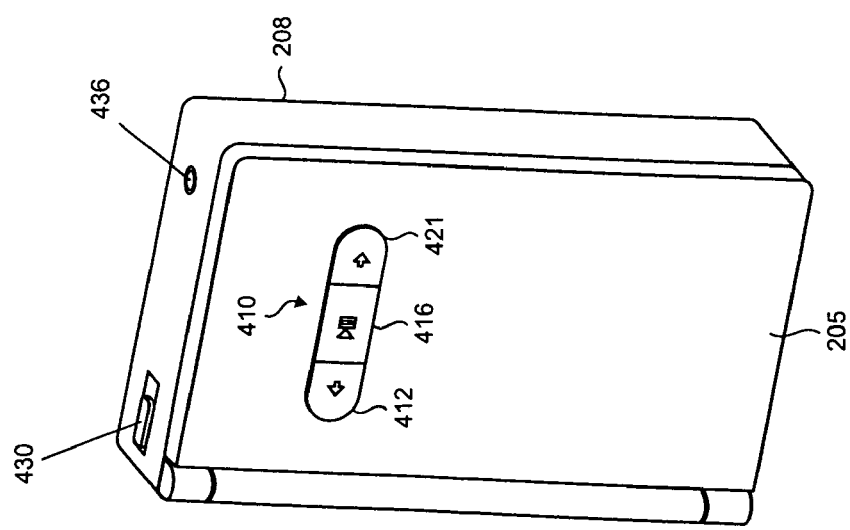
FIG. 4 is a pictorial view of the portable media player in which the flip cover is closed.

Various types of conventional hinge mechanisms may be utilized. In this example, a semi-cylindrical portion 215 of the flip cover 205 is arranged to rotate about one or more pins or axles (not shown) that are captured by stanchions $228_1$ and $228_2$ that are incorporated into the front face of the body 208. The axis of rotation is located along an edge of the body 208 so that the flip cover opens and closes like a cover on a book. The flip cover 205 is sized, in this example, with substantially similar width and height dimensions as the body 208 so that when in its closed position, as shown in FIG. 4, the display screen 218 and user controls 223 are covered.

The flip cover 205 of the media player thus provides protection to the display screen 218 and user controls 223, a feature that is currently lacking in current media player devices. Current media players are all configured in a particular style where the screen is always accessible to the user. However, one drawback of this style is that the display screen can be easily scratched. Some accessory manufacturers have solved this problem by providing covers for the players. But this can lead to a suboptimal user experience in interacting with the device. The flip cover 205 implementation can enable superior user interaction while helping keep the screen 218 from getting scratched when being stored or transported. Scratched display screens are a common consumer complaint as the scratches can significantly reduce the quality of the user experience both when using the display screen as a GUI and when watching video content.

Figure 5:
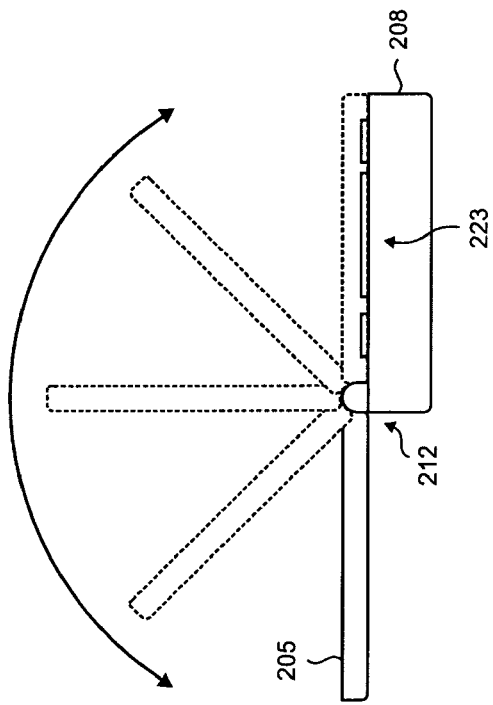
FIG. 5 is a bottom view of the portable media player showing the flip cover in a variety of positions in its range of motion from fully opened to closed.

In most implementations, the hinge 212 is configured as a friction hinge so that the flip cover 205 and body 208 share a common axis about which angular motion is resisted, typically with a constant torque. However, the hinge may also be configured so that the torque may also be variable depending on hinge angle in some implementations. Friction hinges, which are also known as torque hinges, typically allow smooth controlled motion from one position to another. Thus, as shown in FIG. 5, the user may rotate the flip cover 205 into a desired position with respect to the body 208 which will then be held in position by the torque provided by the hinge 212. The provided torque may be asymmetrical in some cases so that different amounts of force can be used when opening and closing the flip cover 205. In alternative implementations, a detent-type hinge may be used that provides one or more "soft stops," or indexed positions, between the open and closed positions of the flip cover 205.

FIG. 5 further illustrates that the interior of the flip cover 205 is given concave configuration, in this example, in order to provide relief for the user controls 223 which typically are raised slightly above the surface of the body 208 to facilitate the user locating and then using the controls. The amount of concavity utilized, if any, can vary according the needs of a given implementation.

While the torque provided by the hinge 212 may be sufficient to keep the flip cover 205 closed in some applications, various types of arrangements may also be utilized to positively hold the flip cover 205 in its closed position or to provide the tactile feedback to the user that the flip cover is in its fully closed and locked position. These arrangements include conventional mechanical clasps or lock mechanisms. The hinge 212 may alternatively be configured with an over-center action or positive detent that is engaged when the flip cover is fully closed.

Figure 6:
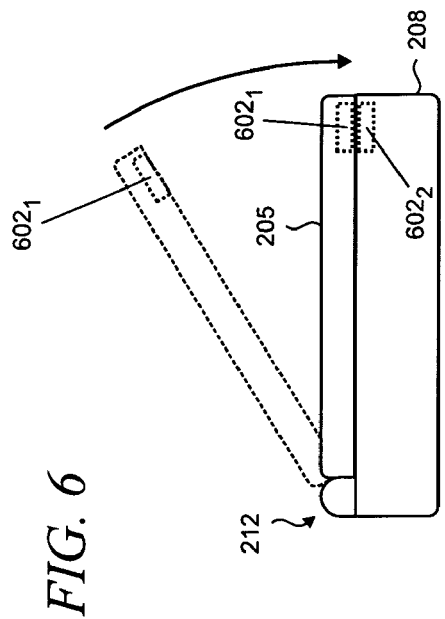
FIG. 6 is a bottom view of the portable media player in which corresponding magnets are used to secure the flip cover in a closed position.

In this particular example, as shown in FIG. 6, a set of magnetic elements are used where magnetic elements $602_1$ and $602_2$ are respectively located in the flip cover 205 and body 208. The magnetic elements 602 here are permanent magnets having their poles aligned so the flip cover 205 and body 208 are magnetically attracted to thereby function as a magnetic clasp when the flip cover is in the closed position against the body.

The magnetic force provided by the magnetic elements 602 is typically selected so that the flip cover 205 and body 208 are held securely enough to keep the flip cover closed if accidentally bumped from the user or by the motions normally experienced when the portable media player 110 is used in an active manner. In addition, the amount of magnetic force may be selected to give positive tactile feedback to the user when closing the flip cover 205 while meeting user expectations as to an amount of force that might reasonably be anticipated to open it.

The magnetic force can be varied by material selection, size, and the relative positioning of the magnetic elements $602_1$ and $602_2$ within the respective flip cover 205 and body 208. In some applications, rare-earth-type magnets, such as samarium-cobalt or neodymium, may be desirable for use as a result of their high magnetic flux density. Alternatively, a single magnet located in either the flip cover 205 or body 208 may be used where its counterpart in the other portion is a ferromagnetic material.

Referring back to FIG. 4, the portable media player 110 is configured with a secondary set of user controls 410 on the exterior of the flip cover 205. This advantageous implementation addresses the concern that a flip cover 205 would prevent easy access to and control of the device 110. While the secondary user controls 410 utilized can vary by implementation, generally they will provide access to the most used control functions that would ordinarily be supported by the main controls 223 shown in FIG. 2. More specifically, the secondary user controls 410 are intended to be supplementary controls that enable the user 105 to use the portable media player 110 while the flip cover 205 is closed. In one specific embodiment, the controls allow the user to play, pause, fast forward, rewind, skip, and adjust volume. As the display screen 218 is inaccessible when the flip cover 205 is closed, the secondary user controls 410 will normally be configured to enable the user to control the player 110 without needing to refer to the GUI 305. Generally then, the functionality supported by the secondary controls 410 will be streamlined and simplified, for example without using branching or nested menu structures, to avoid causing confusion for the user. In addition, each of the secondary user controls 410 will typically be arranged as single function controls.

Accordingly in this example, the secondary controls 410 include a back button 412, a play/pause button 416, and a forward button 421. A common usage scenario might include, for example, the user 105 opening the flip cover 205 to expose the display screen 218 and main user controls 223 to select a pre-programmed playlist of music such as favorite songs from the 1970s. Once the playlist is selected using the GUI 305 on the display screen 218 and the main user controls 223, the user 105 can close the flip cover 205 and place the player 110 in a pocket without fear of damaging the screen if his pocket also contains a set of keys, loose change, etc.

If the user 105 wants to skip ahead or go back in the playlist, he can simply actuate the respective forward and back buttons 421 and 412 without needing to open the flip cover 205 to access the main user controls 223. In some implementations, the secondary controls 410 can be configured with unique features, such as raised portions, bumps, ridges, indentations, etc., so that each control can be identified by touch. In this way, the user can navigate through the playlist by touch without needing to look at the portable media player 110.

The portable media player 110 is configured with common features such as a lock switch 430 and an earphone jack 436. The lock switch 430, when activated, locks out the main and secondary user controls so that stray button pushes or touches are ignored by the player 110. In some implementations, a position sensor may be utilized to detect the position of the flip cover 205 so that the secondary controls 410 are locked out when the flip cover is open. Or, the player 110 may be configured to turn on (i.e., power up, or wake up from sleep mode), when the flip cover 205 is opened.

Figure 7:
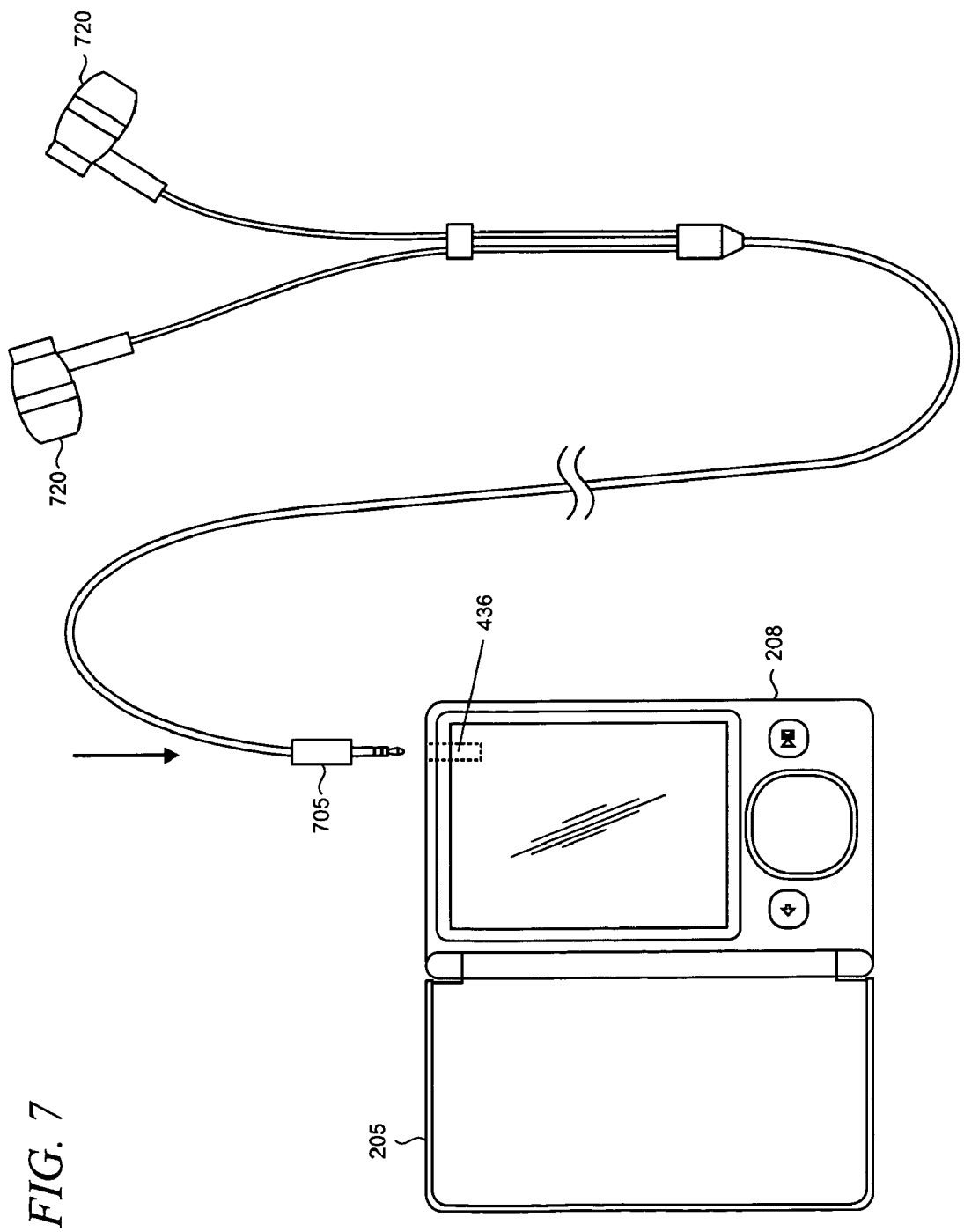
FIG. 7 shows the portable media player in an operative relationship with a set of earphones.

The earphone jack 436 is disposed in the top portion of the portable media player 110 and mates with a mating plug 705 of the earphones 120 as shown in FIG. 7. Typically the player 110 will output a stereophonic signal that when rendered by the earphone speakers 720, produces a stereo effect for the user. Accordingly, the earphone speakers 720 are generally identified as being either intended for the right or left ear of the user 105.

Figure 8:
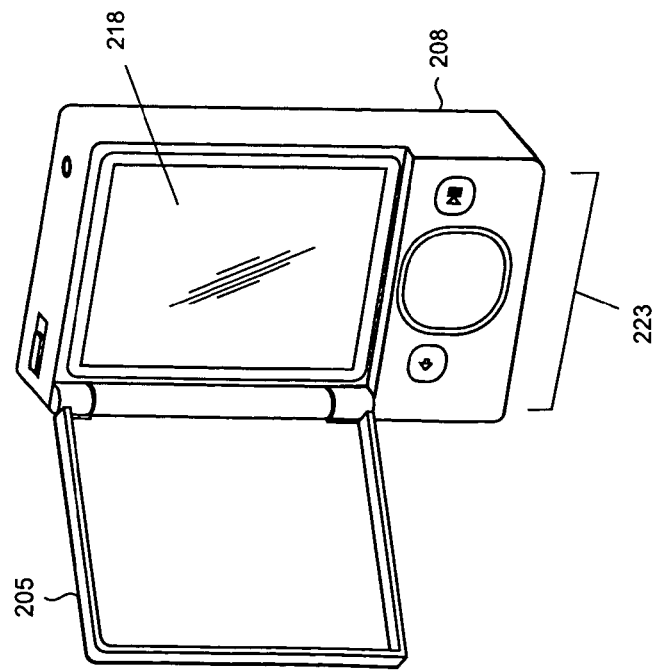
FIGS. 8 and 8A are respective isometric and front views of the portable media player in which the flip cover is closed.
Figure 8A:
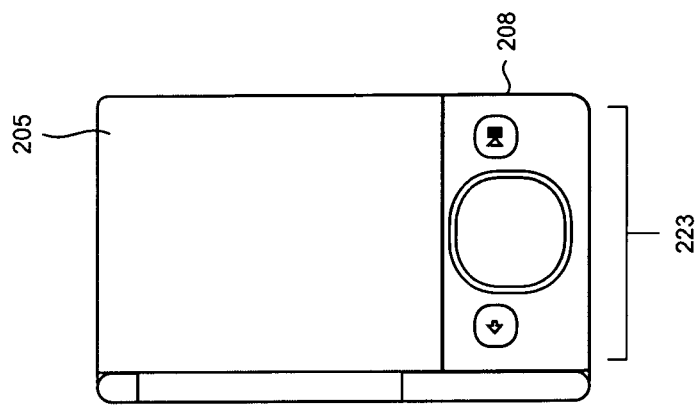

Turning now to FIGS. 8 and 8A, an alternative illustrative configuration for the portable media player 110 is shown. In this example, the flip cover 205 is shortened so that it only covers the display screen 218 when closed, as shown in FIG. 8A, while leaving the main user controls 223 exposed at all times (i.e., irrespective of whether the flip cover 205 is opened or closed). This configuration may be desirable in some scenarios as the elimination of the secondary controls results in fewer parts which can reduce costs while still providing the protection for the display screen 218 and enabling the built-in display stand (as described in more detail in the text accompanying FIGS. 12 and 13).

In this alternative configuration, the functionality of the user controls 223 will typically be dynamically varied according to the position of the flip cover, as detected by the cover position sensor. For example, the normal full functionality of the G-pad may be reduced or disabled to reflect the unavailability of the GUI 305 when the flip cover 305 is in the closed position. In this way when the flip cover 205 is closed, the main user controls 223 can implement the streamlined and simplified functionality in a similar manner as the secondary controls 410 shown in FIG. 4.

Figure 9:
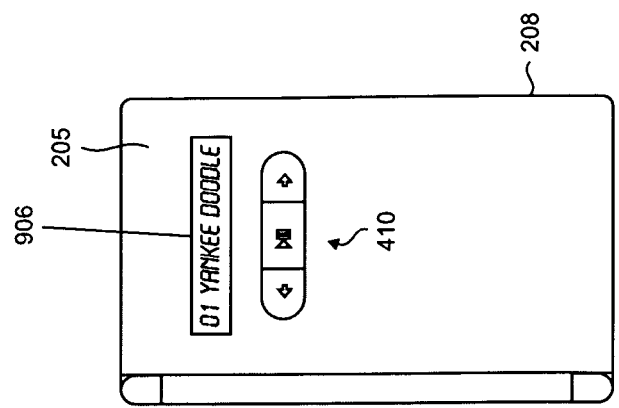
FIG. 9 is a front view of the portable media player in which the flip cover is closed and an optionally utilized secondary display is incorporated into the cover.

FIG. 9 shows another alternative illustrative configuration for the portable media player 110. In this example, the flip cover 205 includes the secondary controls 410 as well as a secondary display screen 906. In this example, the secondary display screen 906 is relatively small compared to the main display screen 218 as it is intended only to provide information such as operational status of the player 110 and not function as the principal GUI. For example, as shown, the secondary display screen 906 may be used to display a track title for music being played from a playlist. In some cases, the characters on the secondary display screen may scroll (e.g., horizontally or vertically) to provide additional information such as artist, album name, and the like. The scrolling may occur automatically, or be performed in response to some user input to the secondary controls 410.

Although the secondary display screen 906 is located on the exterior of the flip cover 205 and as a result is not protected like the main display screen 218, it is vulnerable to scratching and other damage just as a conventional unprotected screen. However, as the secondary display screen 906 is a supplemental display and is not used for the main GUI or to render video content, most users would generally tolerate some reduction in clarity that would result from ordinary wear and tear. In one embodiment, in which the device 110 also has wireless network access capability, the secondary display 906 and underlying software is designed to provide notice to the user if another user is communicating to the device 110 or is within range of the device 110. This allows the user to know if the device 110 can be used to receive or transmit songs, or is receiving or transmitting songs. In an alternate embodiment, a picture or representation of a nearby user can also be displayed on the secondary display 906. For example, in a system in which users have a pictorial representation of themselves as part of a social network embodiment, such as a "music card" or "music tag", the card of a nearby user can also be displayed on the secondary display 906 when the user is nearby. This advantageously allows the user to be aware at a glance of who around the user has a compatible device. For further information, and to contact the nearby users, the user can flip open the device and use the full GUI. Thus, the use of the secondary display 906 allows the device to divide notification and interaction functionalities advantageously between the primary and secondary displays, based on the utility of each.

In addition to providing the display screen and/or user control protection feature discussed above, the flip cover 205 provides additional surface area for customization and personalization (referred to collectively as "personalization"). Typically, conventional portable media players provide a single surface, generally the back of the player, which may be used as an area for personalization since the user controls and display screen generally occupy much of the front of the player.

Figure 11:
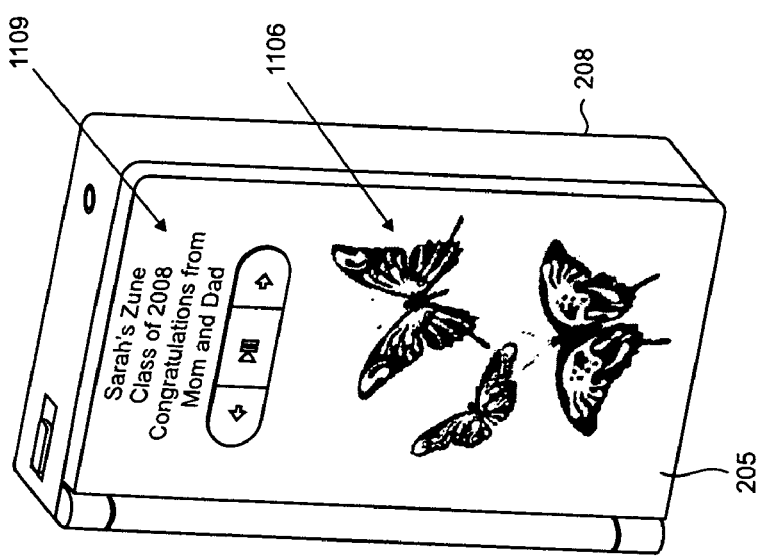
FIGS. 10 and 11 show the portable media player when personalized with artwork and text on the inside and outside surfaces of the flip cover.
Figure 10:
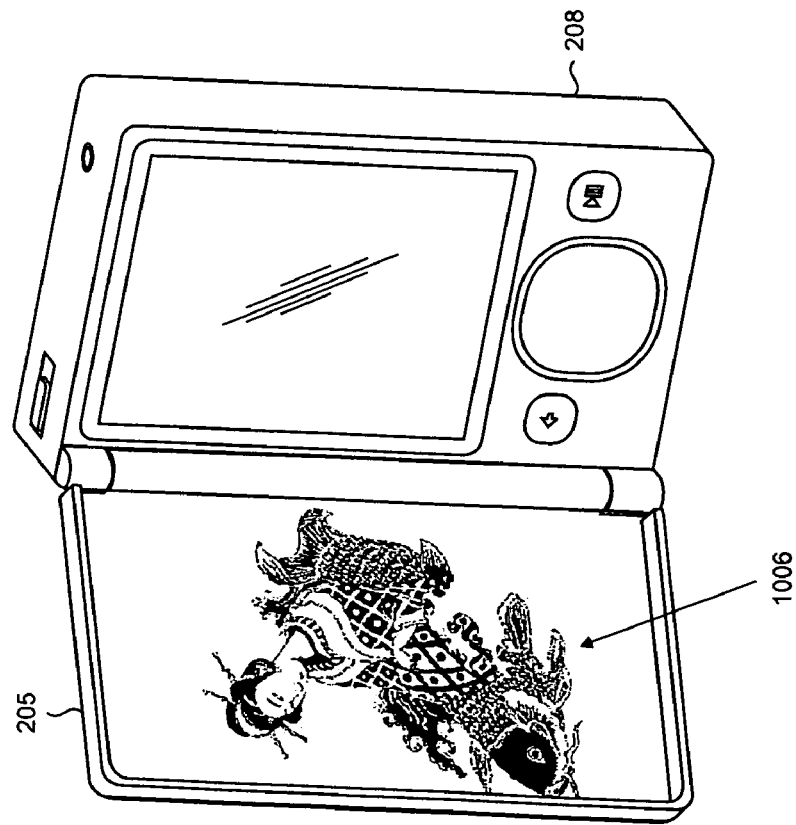

By comparison, as shown in FIGS. 10 and 11, the flip cover 205 essentially triples the available surface area for personalization as both the exterior and interior of the cover are available. In these illustrative examples, the flip cover 205 is fabricated either in whole or in part using a metal material such as aluminum or stainless steel which may be laser etched with artwork and/or text. As shown in FIG. 10, the interior of the flip cover 205 includes etched artwork 1006, while in FIG. 11 the exterior of the flip cover includes both etched artwork 1106 and a text inscription 1109.

In some implementations, the etched artwork and text may be included on the flip cover 205 as part of a personalization program supported by the manufacturer of the portable media player 110 (or by an authorized representative of the manufacturer). In other cases, the laser etching may be performed by aftermarket suppliers. In addition to laser etching, other personalization techniques may be applied to the flip cover 205 including the application of skins made of vinyl or similar materials, stickers, coatings such as paint, and the like. Such other techniques may be utilized by the manufacturer, aftermarket suppliers, and by the users themselves. Whatever techniques or delivery mechanisms are utilized, it is anticipated that users will appreciate the additional space available for personalization and use it to good advantage.

In the case of the manufacturer-supported personalization program, a consumer may purchase a personalized portable media player, for example, on-line via an e-commerce portal such as a web site, via phone, or at a retail store or self-serve kiosk. During the purchasing process, the consumer may typically select from choices such as storage capacity, color, and the like for the player as well as artwork and text that may be used to personalize the interior and exterior of the flip cover (and the back surface of the player in some instances). In one illustrative scenario, the consumer may select from among a variety of pieces of artwork, for example, that are created by known or famous artists. The customer may also compose text to be inscribed on the flip cover to supplement the artwork. The portable media player will then be personalized to the customer's order, typically at a centralized facility or distribution center, and shipped to the customer. In other scenarios, the customer may provide a sample of customized artwork, for example by uploading the sample to a web site or using a facsimile machine, and the manufacturer will personalize the portable media player according to the sample.

Figure 12:
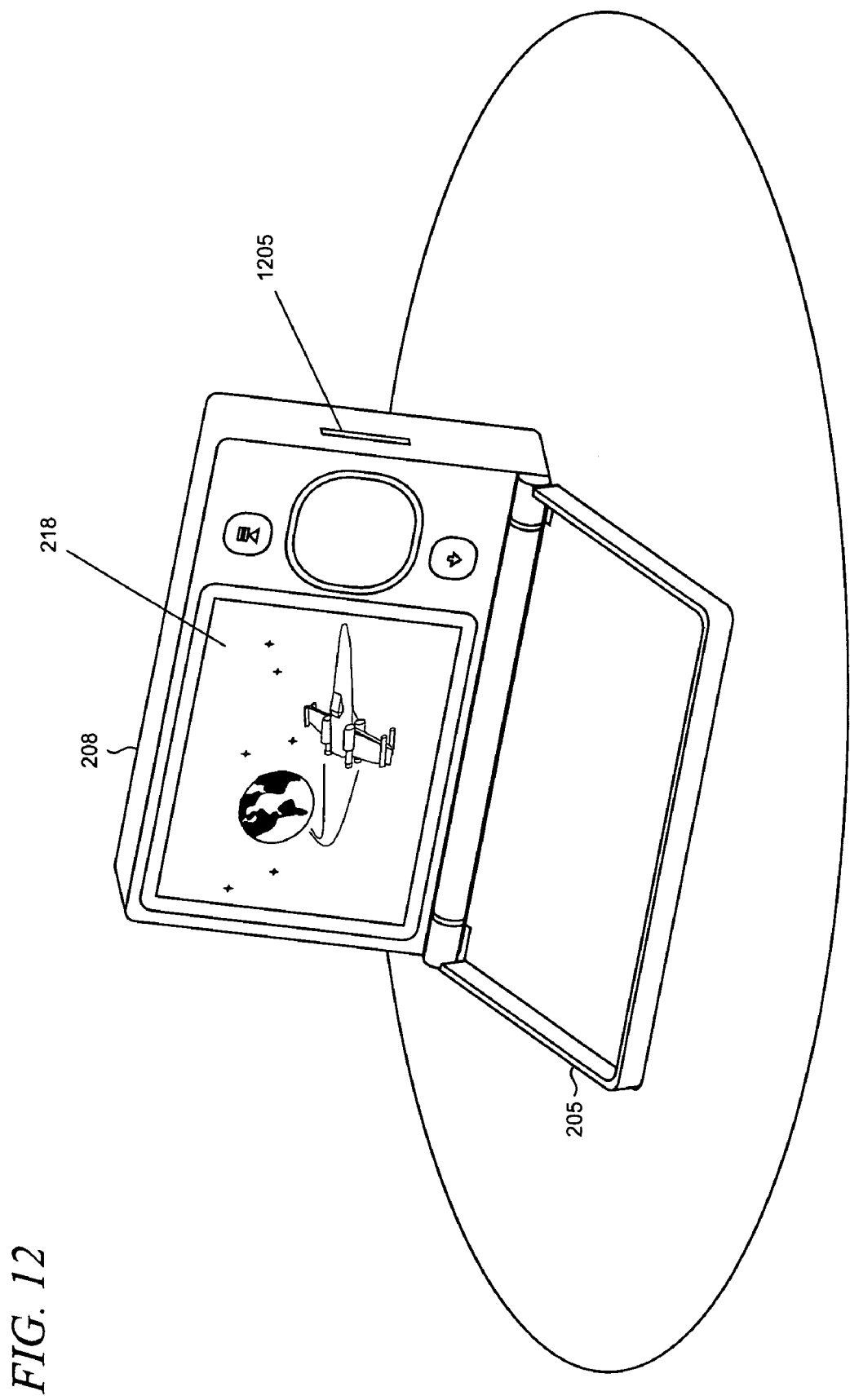
FIG. 12 shows an illustrative configuration in which the flip cover operates to position the portable media play in a convenient orientation for viewing the display.

FIG. 12 shows another feature that is enabled by the flip cover 205. By providing the flip cover with sufficient mass and configuring the hinge 212 with sufficient torque to counter the weight of the body 208 of the portable media player 110, the cover can perform as a built in display stand. In particular, the flip cover and hinge must be arranged to overcome the moment produced by the weight of the body. The moment will increase as angle of the body from a horizontal plane decreases.

This built-in (i.e., integral) display stand feature allows the player 110 to be angled upwards for comfortable hands-free viewing by the user when the player is placed on a surface such as a table top. As shown, the player 110 is placed in a landscape orientation while a video presentation is rendered on the display screen 218.

Figure 13:
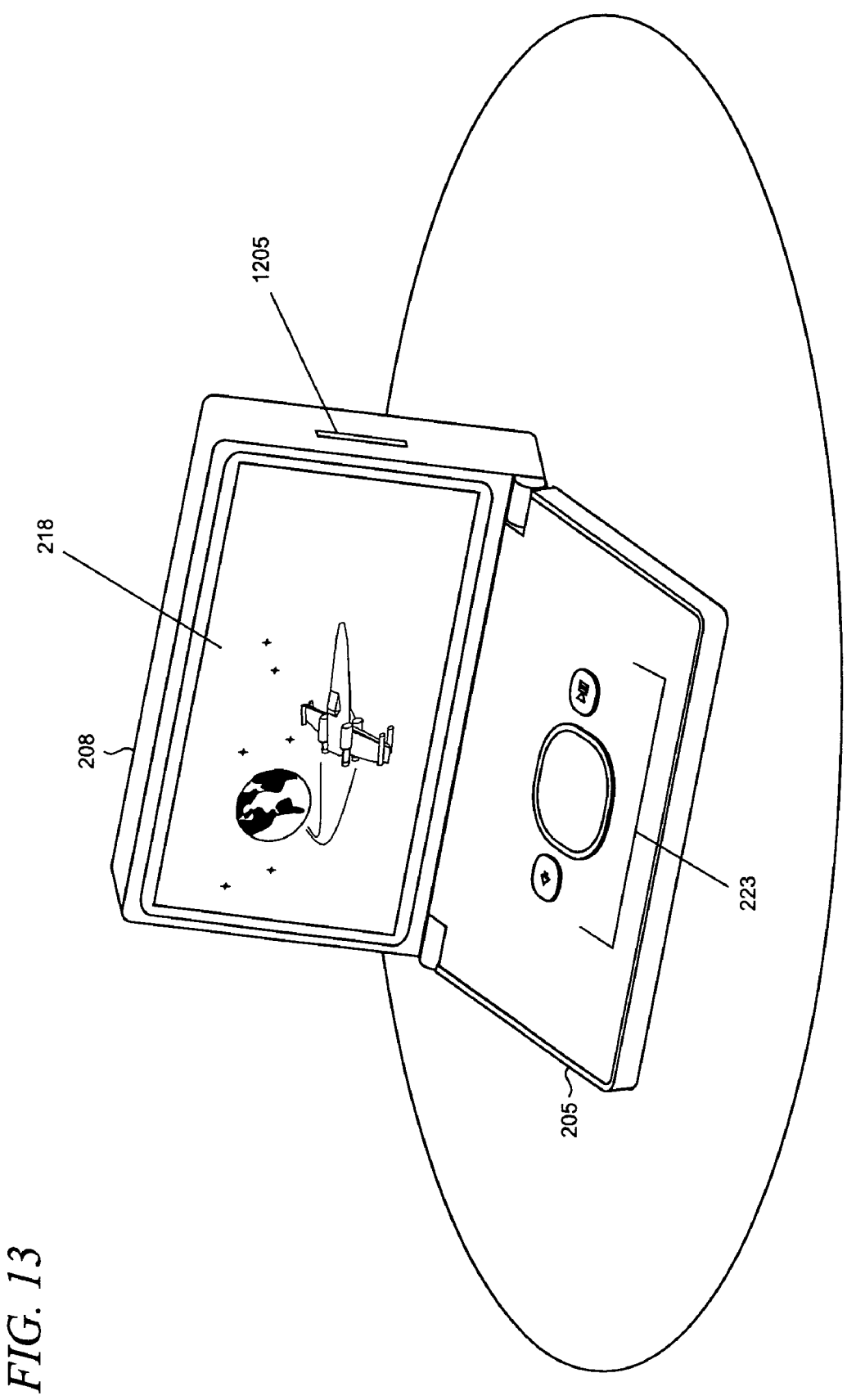
FIG. 13 shows an alternative configuration for the portable media player in which the player controls are located in the flip cover.

The flip cover 205 may be alternatively configured with additional functionality. For example, as shown in FIG. 13, the user controls 223 and display screen 218 are separated between the two hinged portions of the player 110 so that controls are located in the flip cover 205 while the display screen is positioned in the body 208. This alternative configuration allows the display screen 218 to be made larger to extend over the length of the body 208 (although it is not necessary that it be larger). In this example the user controls 223 are positioned in the flip cover 205 in a landscape orientation, however a portrait orientation may also be utilized in some implementations.

Figure 14:
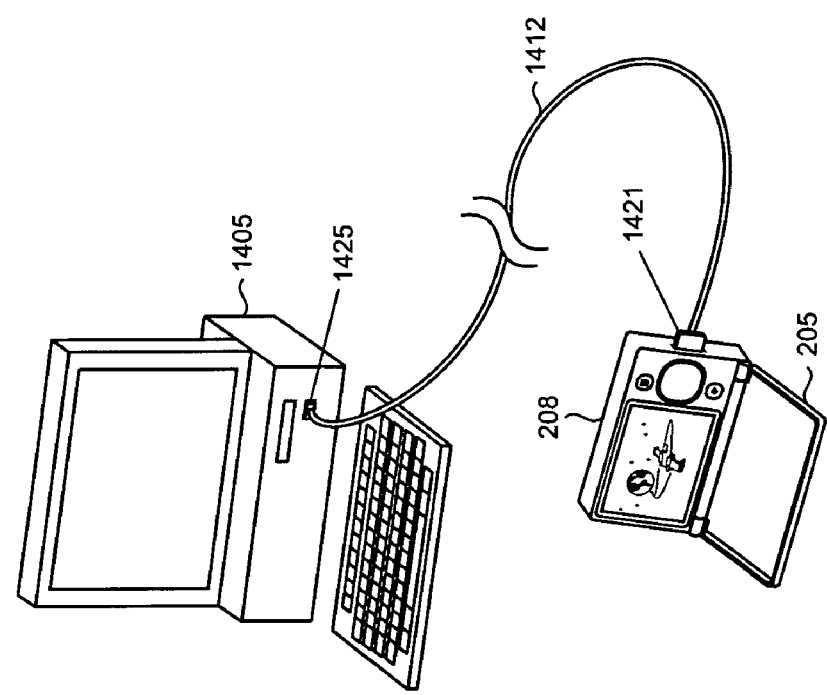
FIG. 14 shows an illustrative arrangement where the portable media player is operatively coupled to a PC with a synchronization ("sync") cable.

FIGS. 12 and 13 also show a sync (i.e., synchronization) port 1205 that is located on the bottom surface of the portable media player 110 (when in a portrait orientation) that includes a female connector. The sync port 1205 allows the player 110 to be coupled and synchronized with other devices or to be charged. For example, FIG. 14 shows the portable media player 110 that is operatively coupled to a personal computer ("PC") 1405 with a sync cable 1412 that is coupled to the port 1205. Connecting the portable media player 110 to the PC 1405 typically enables them to operatively communicate to synchronize data and share media content. A male connector 1421 at one end of the sync cable 1412 plugs into the female connector in the sync port 1205 of the portable media player 110 while a connector at the other end of the sync cable plugs into an accessory port 1425 in the PC 1405.

In this example, the male and female connectors are implemented using a device-specific and proprietary connector pair. However, in alternative implementations, standardized connector types such as USB (Universal Serial Bus) or IEEE-1394 (Institute of Electrical and Electronic Engineers) may be utilized. In this example, the accessory port 1425 on the PC 1405 is configured as a USB port and the connection between the sync cable 1412 and PC 1405 is implemented using a standard USB plug.

In alternative implementations, the portable media player 110 may be configured with a wireless transceiver. In such cases synchronization with the PC 1405 may be performed over a wireless network using, for example, IEEE 802.11 or Wi-Fi standards.

When the portable media player 110 is connected to the PC 1405 with the sync cable 1412 power will typically be provided to charge an onboard battery in the player. Using the flip-cover 205 as a built-in display stand allows the player's display 218 to be positioned to be readily seen and the controls 223 conveniently accessed by the user 105 when the player 110 is being synchronized and/or charged. Thus, in some cases, the flip-cover 205 can eliminate the necessity for the user 105 to purchase and use a separate docking station which typically provides a similar positioning feature.

Figure 15:
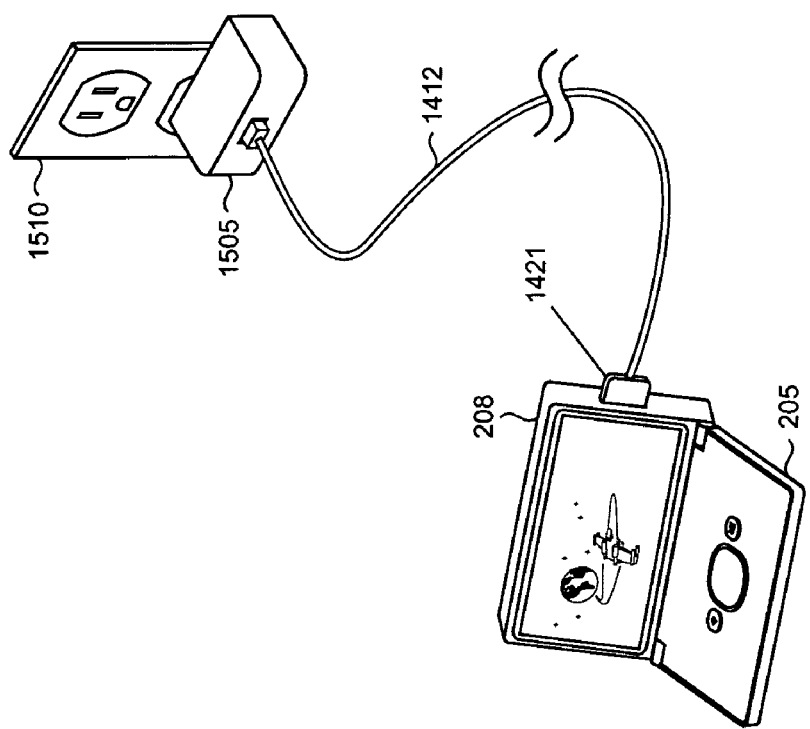
FIG. 15 shows an illustrative arrangement where a portable media player is being charged by a power adapter through the sync cable.

FIG. 15 shows the portable media player 110 when coupled with the sync cable 1412 to an AC power adapter 1505. The AC power adapter 1505 converts the AC power from a wall outlet 1510 into DC power that is typically used to recharge the player's onboard rechargeable battery. As with the example shown in FIG. 14, the flip-cover's use as a built-in display stand allows the user to conveniently view content being rendered by the portable media player 110 while it is plugged in and recharging.

Figure 16:
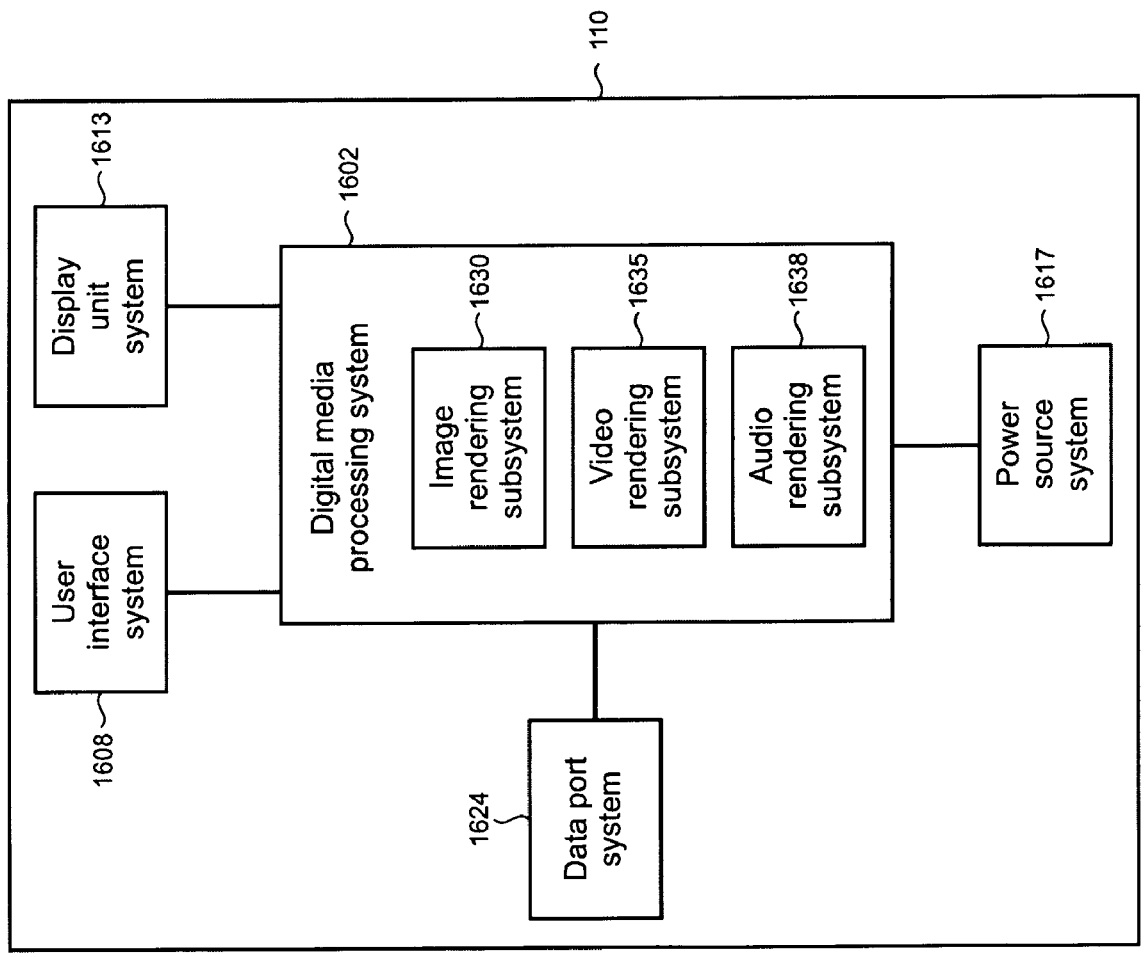
FIG. 16 is a simplified block diagram that shows various functional components of an illustrative example of the present portable media player.

FIG. 16 is a simplified block diagram that shows various illustrative functional components of the portable media player 110. The functional components include a digital media processing system 1602, a user interface system 1608, a display unit system 1613, a power source system 1617, and a data port system 1624. The digital media processing system 1602 further comprises an image rendering subsystem 1630, a video rendering subsystem 1635, and an audio rendering subsystem 1638.

The digital media processing system 1602 is the central processing system for the portable media player 110 and provides functionality that is similar to that provided by the processing systems found in a variety of electronic devices such as PCs, mobile phones, personal digital assistants ("PDAs"), handheld game devices, digital recording and playback systems, and the like.

Some of the primary functions of the digital media processing system 1602 may include receiving media content files downloaded to the player 110, coordinating storage of such media content files, recalling specific media content files on demand, and rendering the media content files into audio/visual output on the display for the user 105. Additional features of the digital media processing system 1602 may also include searching external resources for media content files, coordinating Digital Rights Management ("DRM") protocols for protected media content, and interfacing directly with other recording and playback systems.

As noted above the digital media processing system 1602 further comprises three subsystems: the video rendering subsystem 1635 which handles all functionality related to video-based media content files, which may include files in MPEG (Moving Picture Experts Group) and other formats; the audio rendering subsystem 1638 which handles all functionality related to audio-based media content including, for example music in the commonly-utilized MP3 format and other formats; and the image rendering subsystem 1630 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with the rest of the portable media player 110, as may be necessary to meet the requirements of a particular implementation.

Functionally coupled to the digital media processing system 1602 is the user interface system 1608 through which the user 105 may exercise control over the operation of the portable media player 110. A display unit system 1613 is also functionally coupled to the digital media processing system 1602 and may comprise the main display screen 218 (FIG. 2) as well as the optionally-utilized secondary display screen 906 (FIG. 9). Audio output through the earphone jack 436 (FIG. 4) for playback of rendered media content may also be supported by display unit system 1613. The display unit system 1613 may also functionally support and complement the operation of the user interface system 1608 by providing visual and/or audio output to the user 105 during operation of the player 110.

The data port system 1624 is also functionally coupled to the digital media processing system 1602 and provides a mechanism by which the portable media player 110 can interface with external systems in order to download media content. The data port system 1624 may comprise, for example, a data synchronization connector port, a network connection (which may be wired or wireless), or other means of connectivity.

The portable media player 110 has a power source system 1617 that provides power to the entire device. The power source system 1617 in this example is coupled directly to the digital media processing system 1602 and indirectly to the other systems and subsystems throughout the player. The power source system 1617 may also be directly coupled to any other system or subsystem of the portable media player 110. Typically, the power source may comprise a battery, a power converter/transformer, or any other conventional type of electricity-providing power source, portable or otherwise.

Figure 17:
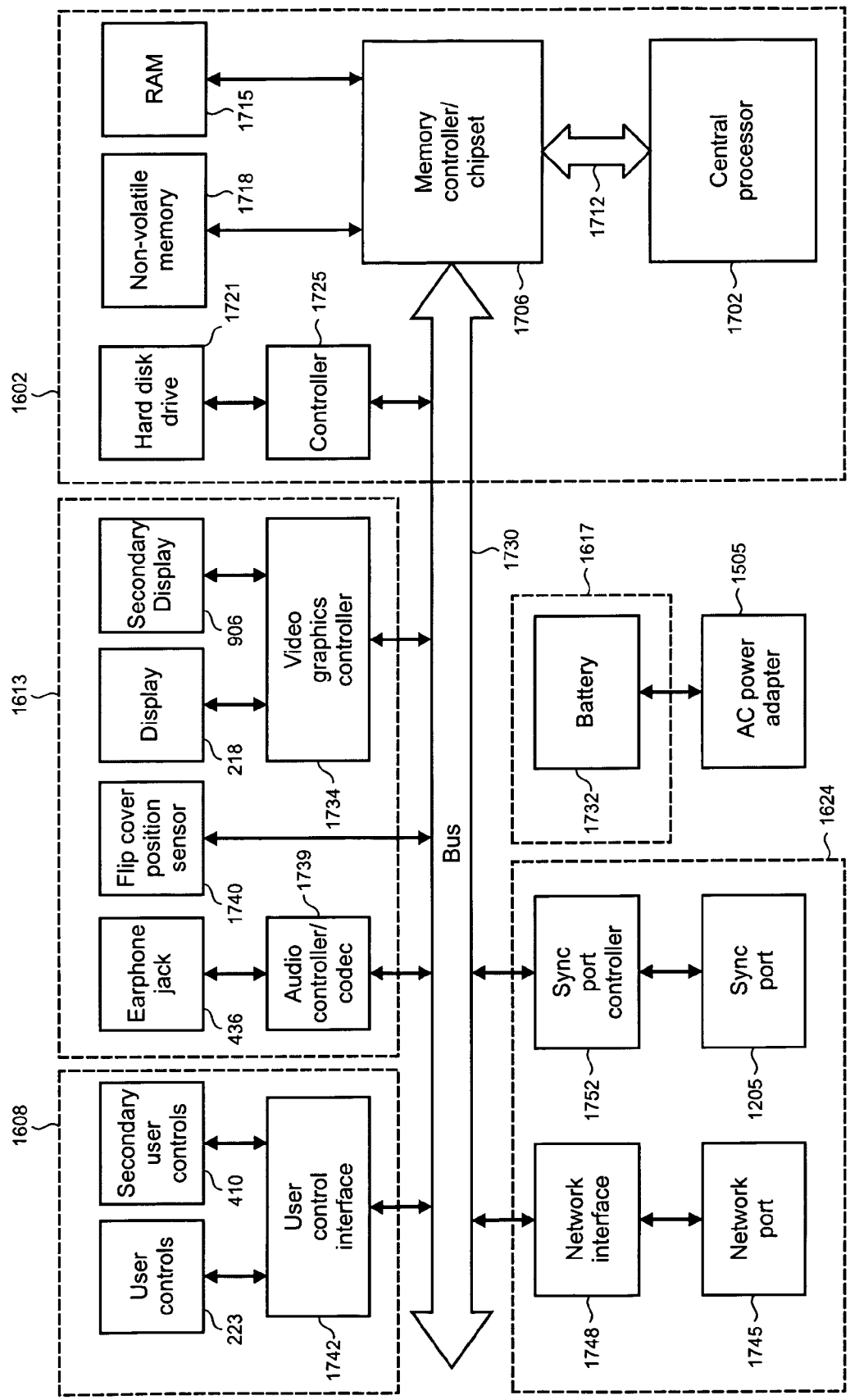
FIG. 17 is a simplified block diagram that shows various physical components of an illustrative example of the present portable media player.

FIG. 17 is a simplified block diagram that shows various illustrative physical components of the portable media player 110 based on the functional components shown in FIG. 16 and described in the accompanying text (which are represented in FIG. 17 by dashed lines) including the digital media processing system 1602, the user interface system 1608, the display unit system 1613, the data port system 1624, and the power source system 1628. While each physical component is shown as included in only a single functional component in FIG. 17 the physical components may, in fact, be shared by more than one functional component.

The physical components include a central processor 1702 coupled to a memory controller/chipset 1706 through, for example, a multi-pin connection 1712. The memory controller/chipset 1706 may be, in turn, coupled to random access memory ("RAM") 1715 and/or non-volatile memory 1718 such as flash memory. These physical components, through connectivity with the memory controller/chipset 1706, may be collectively coupled to a hard disk drive 1721 via a controller 1725, as well as to the rest of the functional component systems via a system bus 1730.

In the power supply system 1628, a rechargeable battery 1732 may be used to provide power to the components using one or more connections (not shown). The battery 1732, in turn, may also be coupled to the external AC power adapter 1505 or receive power via the sync cable 1412 when plugged into the PC 1405.

The display screen 218 (and the optionally-utilized secondary display screen 906) is associated with a video graphics controller 1734. Along with the earphone jack 436 and its associated audio controller/codec 1739, and the flip cover position sensor 1740, these components comprise the display unit system 1613 and may be directly or indirectly connected to the other physical components via the system bus 1730.

The main user controls 223 and the secondary user controls 410 are associated with a user control interface 1742 in the user interface system 1608. A network port 1745 and associated network interface 1748, along with the sync port 1205 and its associated controller 1752 may constitute the physical components of the data port system 1624. These components may also directly or indirectly connect to the other components via the system bus 1730.

It will be appreciated that the principles of the present flip cover with secondary controls and hinge arrangement that provides a built-in display stand may be generally applied to other devices beyond media players. Such devices include, for example, mobile phones, PDAs, smart phones, handheld game devices, ultra-mobile computers, devices including various combinations of the functionalities provided therein, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A portable media player, comprising:
   a body, having a weight, arranged for housing a digital media processing system and a display screen, the digital media processing system interfacing with the display screen to render digital media content in the form of images or video;

a flip cover configured for being positionable by a user between an open position and a closed position, the flip cover exposing the display screen when in the open position, and covering the display screen when in the closed position, the flip cover further functioning as an integral display stand when in the open position so that the display screen is fixedly held upright in a user-selected orientation with respect to the flip cover when resting on a surface; and a hinge configured for hingedly coupling the flip cover to the body, wherein said flip cover has sufficient mass and said hinge has sufficient torque to counter the weight of said body.

2. The portable media player of claim 1 in which the hinge is selected from one of friction hinge or detent hinge.

3. The portable media player of claim 1 further comprising a set of one or more main user controls that are disposed in the body and coupled to the digital media processing system.

4. The portable media player of claim 1 further comprising a set of one or main user controls that are disposed in the flip cover and coupled to the digital media processing system and exposed for manipulation by user on an interior portion of the flip cover.

5. The portable media player of claim 3 further comprising one or more secondary user controls that are disposed in the flip cover and coupled to the digital media processing system and exposed for manipulation by user on an exterior portion of the flip cover.

6. The portable media player of claim 5 in which the secondary controls are configured to perform a subset of functionalities provided by the main user controls.

7. The portable media player of claim 1 further comprising a secondary display screen located on an exterior surface of the flip cover.

8. The portable media player of claim 3 in which the flip cover is configured for covering the display screen and main user controls when in the closed position.

9. The portable media player of claim 5 in which the secondary user controls include at least one of play, pause, fast forward, rewind, skip, adjust volume.

10. The portable media player of claim 1 further comprising a latching mechanism configured for positively securing the flip cover when in the closed position.

11. The portable media player of claim 10 in which the latching mechanism comprises a magnet located in the body that is magnetically attracted to either a corresponding magnet or ferromagnetic material in the flip cover when the flip cover is closed or partially closed.

* * * * *

UNITED STATES PATENT AND TRADEMARK OFFICE
CERTIFICATE OF CORRECTION

| | | |
|---|---|---|
| PATENT NO. | : 8,155,714 B2 | Page 1 of 1 |
| APPLICATION NO. | : 12/164027 | |
| DATED | : April 10, 2012 | |
| INVENTOR(S) | : James E. Allard | |

It is certified that error appears in the above-identified patent and that said Letters Patent is hereby corrected as shown below:

IN THE DRAWINGS:

Sheet 1 of 11, Fig. 1, line 1, below "FIG. 1" insert -- 100 --.

Sheet 2 of 11, Fig. 2, line 1, below "FIG. 2" insert -- 110 --.

Sheet 2 of 11, Fig. 3, line 1, below "FIG. 3" insert -- 110 --.

Sheet 3 of 11, Fig. 4, line 1, below "FIG. 4" insert -- 110 --.

Sheet 4 of 11, Fig. 7, line 1, below "FIG. 7" insert -- 120 --.

Sheet 4 of 11, Fig. 7, line 3, above "205" insert -- 110 --.

Sheet 5 of 11, Fig. 8, line 1, below "FIG. 8" insert -- 110 --.

Sheet 5 of 11, Fig. 8A, line 1, below "Fig. 8A" insert -- 110 --.

Sheet 5 of 11, Fig. 9, line 1, below "Fig. 9" insert -- 110 --.

Sheet 6 of 11, Fig. 10, line 1, below "Fig. 10" insert -- 110 --.

Sheet 6 of 11, Fig. 11, line 1, below "Fig. 11" insert -- 110 --.

Sheet 7 of 11, Fig. 12, line 1, below "Fig. 12" insert -- 110 --.

Sheet 8 of 11, Fig. 13, line 1, below "Fig. 13" insert -- 110 --.

Sheet 9 of 11, Fig. 14, line 1, before "208" insert -- 110 --.

Sheet 9 of 11, Fig. 15, line 1, before "208" insert -- 110 --.

IN THE CLAIMS:

In column 11, line 24, in Claim 4, after "or" insert -- more --.

Signed and Sealed this
Tenth Day of February, 2015

Michelle K. Lee
*Deputy Director of the United States Patent and Trademark Office*